April 11, 1950        C. E. WYCECH        2,503,369
FISH LURE
Filed Feb. 10, 1948
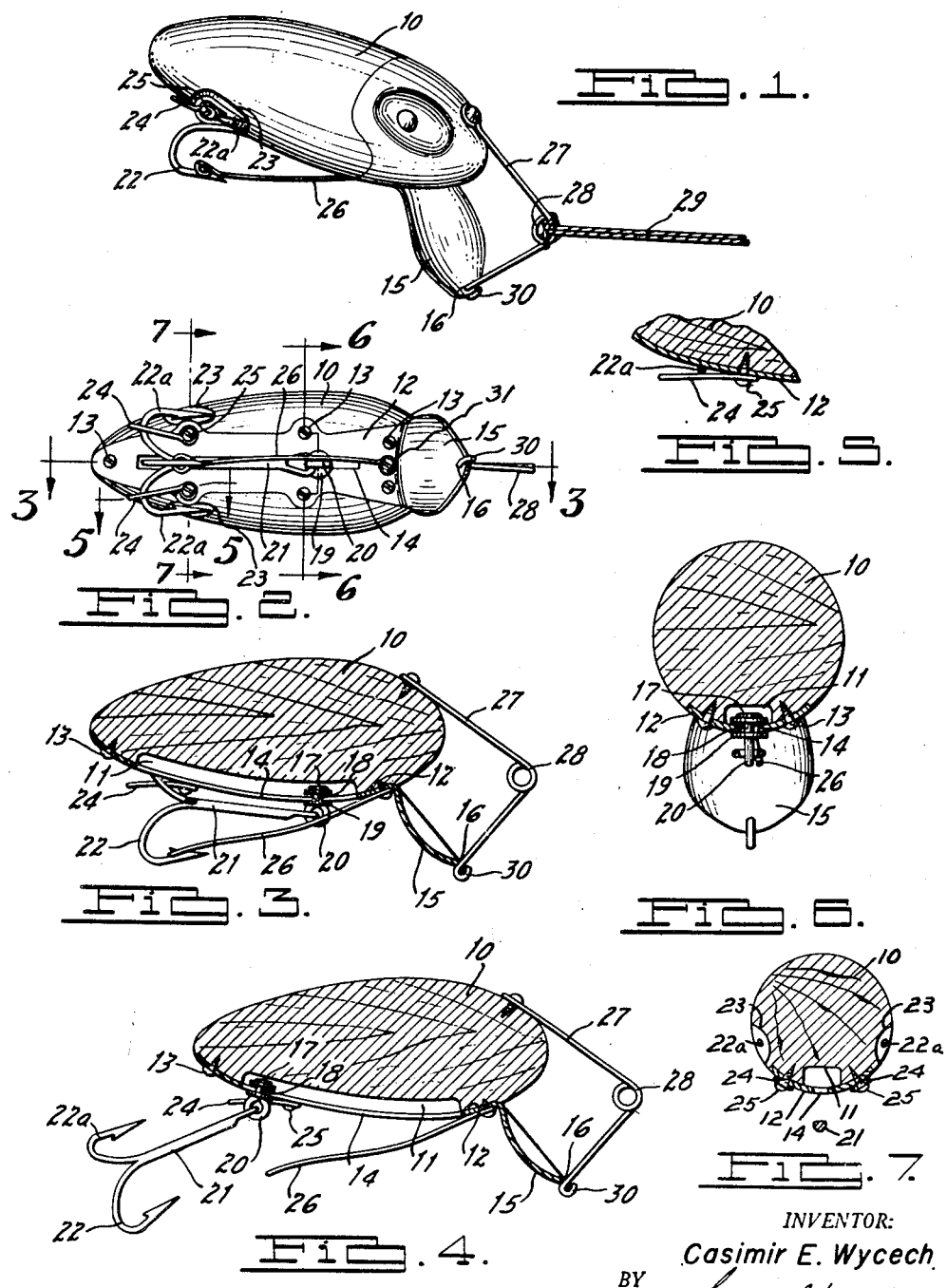
INVENTOR:
Casimir E. Wycech
BY Louis Chayke
ATTORNEY.

Patented Apr. 11, 1950

2,503,369

UNITED STATES PATENT OFFICE 2,503,369

FISH LURE

Casimir E. Wycech, Dearborn, Mich.

Application February 10, 1948, Serial No. 7,410

4 Claims. (Cl. 43—42.41)

My invention pertains, in general, to fish lures simulating the body of a fish and provided with a cluster of fish hooks. More specifically, my improvement pertains to a fish lure which may be normally used for fishing in open waters free of vegetable growth in which hooks might ordinarily get entangled. Should, however, the fish lure be used in water where such vegetable growth is present, the cluster of hooks which depends from said lure is pulled up into abutment with the body of the plug, leaving only one hook for operative use, the last-named hook being protected by a resilient member to deflect weeds encountered by said plug.

More specifically, the object of my improvement is to provide a plug having a longitudinal slot on the underside of its body and having therein a sliding eye to which the cluster of fish hooks may be attached, this is in order to change the relative position of the hooks with respect to said body of the plug. Another object of my improvement is to provide a plug having other, more conventional features, but one which is reliable in use and economical in the cost of its production.

I shall now describe my improvement with reference to the accompanying drawings in which:

Figure 1 is a perspective view of my fish lure;

Figure 2 is a bottom, elevational view of said lure;

Figure 3 is a longitudinal, sectional view of my lure on line 3—3 of Figure 2;

Figure 4 is a longitudinal, sectional view of my lure with elements in different operative positions;

Figure 5 is of a sectional view showing a detail of construction of my lure taken on line 5—5 of Figure 2;

Figure 6 is a transverse, sectional view on line 6—6 of Figure 2;

Fig. 7 shows a sectional view on line 7—7 of Fig. 2.

Similar numerals refer to similar parts throughout the several views.

The body 10 of the lure is made, as already mentioned, substantially in the shape of a stubby fish. Disposed on the underside thereof is a deep groove 11 covered by a long plate 12 which is secured to the body of the lure by means of screws 13. The plate, having a slot 14 over the groove 11 and extending in the same direction, includes a spoon 15 at the front end of the lure. The spoon is declined downwardly and has, at its front end, an aperture 16. Slidingly disposed within the groove 11 is a button-like member 17 having on its underside a stem 18 passing through said slot 14 and provided with a washer 19. The latter is of a diameter larger than the width of the slot 14 and ends in an eye 20. A cluster of three fish hooks, one of which is marked 22 and the others 22a, have a common stem 21 which is attached to said eye in the conventional manner.

Ordinarily, the cluster of hooks, as shown in Figure 4, depends downwardly, the button shaped member 17 being at the rear end of the groove 11, as best shown in Figure 4. When, however, it is desired to use the lure for fishing in waters where weeds are present, the button shaped member 17 is slid forwardly to a position shown in Figure 3. This permits two of the clusters of fish hooks 22 to be brought up against the body of the lure, the respective hooks 22a fitting into the recesses 23 best shown in Figure 2. Flexible guards 24, made of wire in the shape of an antenna or whiskers, serve to keep said hooks 22a in place. For that purpose, they are attached at one end to the body of the lure over the plate 12 by means of screws 25 and project rearwardly across the U-shaped parts of hooks 22 as best shown in Figure 2. Only one of the hooks 22 will project downwardly as shown in Figures 1 and 3, said hook alone being in an open operative position. However, to prevent weeds from being gathered in the crook thereof, I have provided the lure with a deflector 26, this being a slender, resilient feeler-like wire attached to the underside of the body of the lure by means of a screw 31. The feeler extends rearwardly over the open space between the shank 21 of the hook 22 and its pointed, barbed end. While the deflector has sufficient rigidity to deflect weeds, it yields easily when pressed down by the jaw of a fish.

It may be mentioned at this juncture that the said button shaped member 17 and the washer 19 are spaced from each other sufficiently enough to be in a frictional contact with the rim portions of slot 14 of plate 12 so that, as a rule, manual operation is needed to shift said button member longitudinally within said slot, this prevents accidental disengagement of the hooks 22a from their position in abutment with the part of the lure as shown in Figure 2.

Figure 4 shows deflector 26 in its disengaged position, that is in a position when the cluster of hooks has been shifted rearwardly for operation in waters free of weeds.

To supplement the description, I wish to add that fishline 29, by means of which the lure is drawn through water, is attached to said lure by means of a wire link 27 looped at 28 and connected at its lower end 30 to the spoon 15, said end 30 fitting into an aperture 16 in said spoon.

It will be obvious that some changes may be made in the structure of my fish lure, particularly with respect to the elements permitting the shifting of the cluster of hooks longitudinally under the body of the lure and securing the hooks against the surface of the body of the lure, and that these changes may be made without departing from the inventive principle disclosed herein.

What I, therefore, wish to claim is as follows:

1. A lure comprising a fish-like body having a longitudinal groove on its underside, sliding means within the groove for attachment of a three-hook cluster, the cluster being adapted to be swung upwardly against the body, wire guards affixed to the rear portion of said body to retain two of said hooks in a body-abutting position, and leaving the third hook extending downwardly, the crook of said third hook being open forwardly, a weed deflector extending from the front portion of the underside of the body towards said third hook and yieldingly closing the open space between the shank and the point thereof, and means at the front of the body for attachment of a fish line.

2. A lure comprising a fish-like body having a longitudinal groove on its underside, a metal plate affixed over said groove and having a slot therein in register with said groove, a sliding button within the groove having a stem projecting through the slot and terminating with an eye, a three-hook cluster having a single shank pivotally attached to said eye, the cluster being adapted to be swung upwardly from said eye against said body, while guards affixed to the rear portion of said body to retain two of said hooks in a body-abutting position and leaving the third hook extending downwardly but open forwardly, a weed deflector extending from the front portion of the underside of the body towards said third hook and yieldingly closing the open space between the shank and the pointed end of said hook, and means at the front of the body for attachment of a fish line.

3. A lure comprising an oblong body having a longitudinal groove on its underside, a metal plate covering said groove but having an oblong slot therein in register with said groove, a fish-hook supporting member slidingly disposed within the groove and projecting outwardly through said slot, said member being adapted to be slid from the forward portion of the body to the rear portion thereof, a three-hook cluster including a common shank being swingingly attached to said supporting member, said body being provided at the rear portion thereof with a shallow recess on each side of the slot, the cluster being adapted to be swung upwardly against said body, permitting the points of two hooks to fit into respective recesses, wire guards on the underside of said body to extend crosswise of the outer portions of the hooks to retain them within said recesses and leaving the third hook extending downwardly, the crook of said third hook being open forwardly, a weed deflector extending from the front portion on the underside of said body towards said third hook and yieldingly closing the open space between the shank and the pointed end of the hook, and means at the front of the body for attachment of a fish line.

4. A lure comprising a fish-like body having on its underside a groove extending in the direction of the longitudinal axis of said body and extending substantially from one end to the other thereof, a metal plate affixed over said groove and having a slot in register and substantially equal in length with said groove, the plate forming, at the front end of said body, a downwardly inclined spoon, a fish-hook supporting member slidingly disposed within the groove and projecting outwardly through said slot, a three-hook cluster including a common shank being pivotally attached to said supporting member, said body being provided at the rear portion thereof with a shallow recess on each side of the slot, the cluster being adapted to be swung upwardly against said body, permitting the points of two hooks to fit into respective recesses, resilient wire guards on the underside of said body to extend cross-wise of the outer portions of the hooks to retain them within said recesses and leaving the third hook extending downwardly, the crook of said third hook being open forwardly, a weed deflector extending from the front portion on the underside of said body towards said third hook and yieldingly closing the open space between the shank and the pointed end of the hook, and means at the front of the body for attachment of a fish line.

CASIMIR E. WYCECH.

REFERENCES CITED

The following references are of record in the file of this patent:

UNITED STATES PATENTS

| Number | Name | Date |
|---|---|---|
| 1,296,701 | Sakaue | Mar. 11, 1919 |
| 1,773,561 | Wethall | Aug. 19, 1930 |
| 2,147,444 | Kelly | Feb. 14, 1939 |